United States Patent [19]

Evers et al.

[11] 4,229,566

[45] Oct. 21, 1980

[54] ARTICULATED PARA-ORDERED AROMATIC HETEROCYCLIC POLYMERS CONTAINING DIPHENOXYBENZENE STRUCTURES

[75] Inventors: Robert C. Evers, Dayton; Fred E. Arnold, Centerville; Thaddeus E. Helminiak, Dayton, all of Ohio

[73] Assignee: The United States of America as represented by the Secretary of the Air Force, Washington, D.C.

[21] Appl. No.: 69,476

[22] Filed: Aug. 24, 1979

[51] Int. Cl.$^2$ .................... C08G 73/18; C08G 73/22; C08G 75/32
[52] U.S. Cl. ............................... 528/185; 528/172; 528/179; 528/207; 528/208; 528/210; 528/211
[58] Field of Search .............. 528/172, 185, 179, 207, 528/208, 210, 211

[56] References Cited

U.S. PATENT DOCUMENTS

| | | | |
|---|---|---|---|
| 2,904,537 | 9/1959 | Brinker et al. | 528/185 |
| 3,260,700 | 7/1966 | Rudner et al. | 528/185 |
| 3,306,876 | 2/1967 | Kantor et al. | 528/185 |
| 3,620,999 | 1/1971 | Marvel | 528/185 |
| 3,864,310 | 2/1975 | Saferstein | 528/185 |
| 4,051,108 | 9/1977 | Helminiak et al. | 528/185 |

*Primary Examiner*—Lester L. Lee
*Attorney, Agent, or Firm*—Joseph E. Rusz; Cedric H. Kuhn

[57] ABSTRACT

Para-ordered aromatic heterocyclic polymers characterized by having p-benzbisoxazole, p-benzbisthiozole or p-benzbisimidazole units and containing diphenoxybenzene structures. The diphenoxybenzene structures function as "swivels" in the polymer chains, imparting flexibility thereto and making it possible to cast strong films from solutions of the polymers.

13 Claims, No Drawings

ARTICULATED PARA-ORDERED AROMATIC HETEROCYCLIC POLYMERS CONTAINING DIPHENOXYBENZENE STRUCTURES

RIGHTS OF THE GOVERNMENT

The invention described herein may be manufactured and used by or for the Government of the United States for all governmental purposes without the payment of any royalty.

FIELD OF THE INVENTION

This invention relates to para-ordered aromatic heterocyclic polymers containing diphenoxybenzene structures. In one aspect, it relates to a process for preparing the polymers.

BACKGROUND OF THE INVENTION

As described in the literature, p-benzobisoxazole polymers, e.g., poly{[benzo(1,2-d:5,4-d')bisoxazole-2,6-diyl]-1,4-phenylene}, can be synthesized with inherent viscosities of up to 3.7 dl/g. These polymers possess high thermooxidative stability and, because of their all-para, rod-like character, they are capable of forming liquid crystalline phases in concentrated solutions of methanesulfonic acid. Ultra-high strength, high modulus fibers possessing a high degree of oriented, crystalline character can be obtained from these solutions. However, attempts to cast strong films from the methanesulfonic acid solutions have been unsuccessful. It has been possible to obtain only very brittle films.

It is a principal object of this invention, therefore, to provide para-oriented polymers which can be used to fabricate films and composites having outstanding physical properties.

Another object of the invention is to provide para-ordered aromatic heterocyclic polymers containing diphenoxybenzene structures.

A further object of the invention is to provide a process for preparing the polymers.

Still another object of the invention is to provide films prepared from the polymers.

Other objects and advantages of the invention will become apparent to those skilled in the art upon consideration of the accompanying disclosure.

SUMMARY OF THE INVENTION

The present invention resides in a para-ordered aromatic heterocyclic polymer consisting essentially of repeating units having a structure as represented by one of the following formulas:

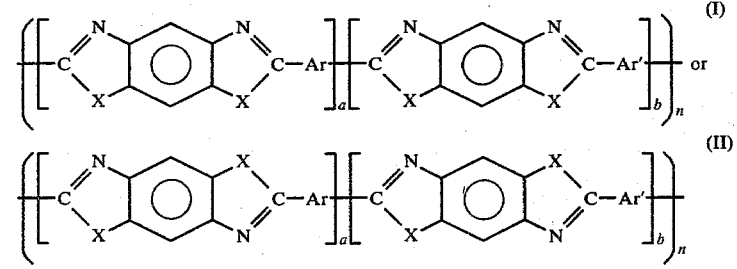

wherein each X is O, S or NH, directed meta to each other as in Formula I or para to each other as in Formula II; Ar is

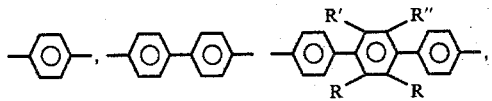

where R is a monovalent aromatic radical; R' and R" are individually selected from the group consisting of hydrogen, a monovalent aromatic radical, a monovalent aliphatic radical, a monovalent cycloaliphatic radical, and a monovalent heterocyclic radical; Ar' is a bis(oxyphenylene)benzene radical; a ranges from about 0.75 to 0.97, b ranges from about 0.03 to 0.25, and the sum of a and b equals 1; and n is an integer equal to the number of repeating units. In general, the number of repeating units is such that the polymer has an inherent viscosity of 2 to 12 dl/g as determined in methanesulfonic acid at 25° C.

Examples of monovalent aromatic radicals include the following:

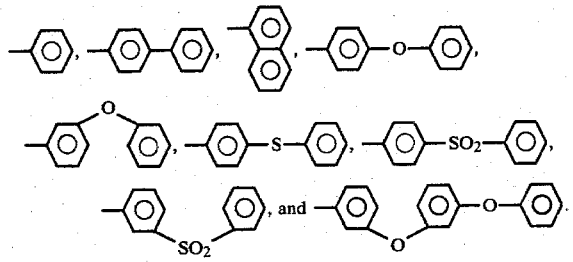

The following are examples of monovalent aliphatic, cycloaliphatic and heterocyclic radicals: —CH$_2$CH$_3$, —CH$_2$CH$_2$CH$_3$, —CH$_2$CH$_2$CH$_2$CH$_3$,

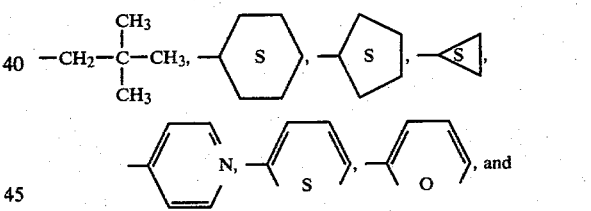

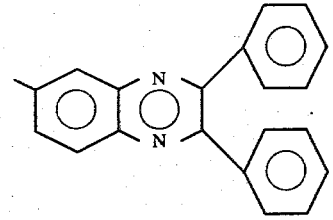

Examples of bis(oxyphenylene)benzene radicals, i.e.,

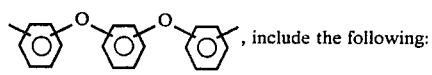, include the following:

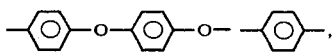,

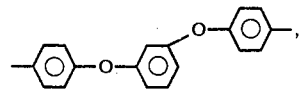,

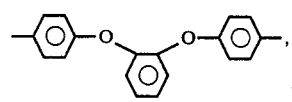,

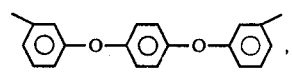,

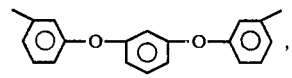,

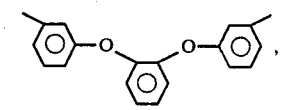,

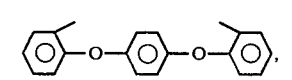,

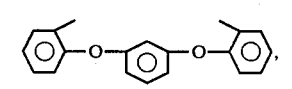,

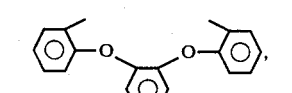,

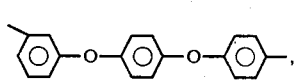,

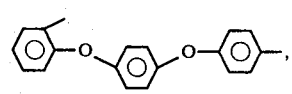,

,

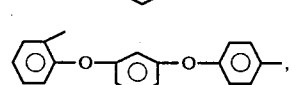,

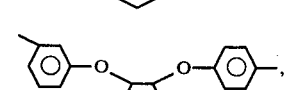,

,

,

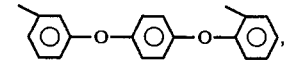,

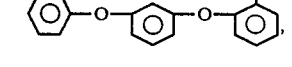,

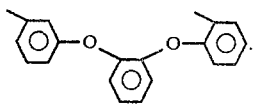.

As seen from the foregoing, the polymers of this invention are characterized by having p-benzbisoxazole (X=O), p-benzbisthiazole (X=S) or p-benzbisimidazole (X=NH) units and bis(oxyphenylene)benzene (Ar') units. The latter units function as "swivels" in the polymer chains so that their presence in a limited and predetermined amount imparts flexibility to the chains. Thus, the structure of the copolymers makes it possible to cast strong films from solutions while retaining the capability to exhibit liquid crystalline behavior. Furthermore, the copolymers exhibit very high inherent viscosities, e.g., as high as 9.0 dl/g and higher.

In one embodiment, the present invention resides in a process for preparing the articulated para-oriented copolymers. Thus, the polymers are synthesized by the condensation of terephthalic acid or p-phenylene-dicarboxylic acid or a phenylated terphenyl dicarboxylic acid, a dihydroxy or dimercapto diaminobenzene dihydrochloride or tetraaminobenzene dihydrochloride or tetrahydrochloride, and a difunctional diphenoxybenzene. The condensation reactions involved are illustrated by the following equation:

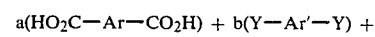

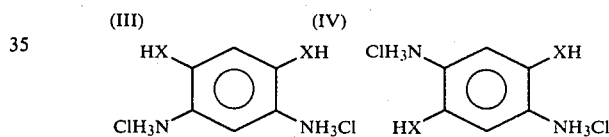

In the foregoing equation, Ar, Ar', X, a and b are as defined above while Y is $CO_2H$, $CO_2CH_3$, $COCl$, $CN$, or $CONH_2$.

In conducting the process, the amino monomer (V) or (VI) and the dicarboxylic acid (III) are mixed with polyphosphoric acid. The polyphosphoric acid functions as a solvent and also acts to dehydrochlorinate the amino monomer. It is also within the scope of the invention to utilize a solvent such as 2,3,4,5-tetrahydrothiophene-1,1-dioxide (sulfolane) in which case smaller amounts of polyphosphoric acid can be used, i.e., an amount sufficient to dehydrochlorinate the amino monomer. The mixture is heated in an inert gas atmosphere at a temperature of about 100° to 150° C. over a period of about 12 to 24 hours. Included among inert gases that can be employed are nitrogen, argon and helium. At the end of this period, the difunctional diphenoxybenzene (IV) is added together with an additional amount of polyphosphoric acid or sulfolane as required to provide a stirrable mixture. An equimolar amount of the amino monomer as compared to the combined amount of the dicarboxylic acid and difunctional diphenoxybenzene is generally used. When used alone, the amount of polyphosphoric acid used is that which is sufficient to provide a stirrable mixture. In general, the concentration of monomers in the polyphosphoric acid usually ranges from about 0.5 to 3.0 percent. When sulfolane is employed as a solvent, the weight ratio of polyphosphoric acid to sulfolane can vary within rather wide limits, e.g., 4:1 to 1:4.

The reaction mixture is heated at a temperature in the range of about 150° to 225° C. for a period ranging from about 36 to 96 hours. In a preferred procedure, the reaction temperature is increased gradually during the reaction period, e.g., 150° C. for 16 hours, 175° C. for 6 hours, 185° C. for 16 hours, and 195° C. for 48 hours. At the end of the reaction period, the polymer product is generally in a very viscous or solid state. After cooling, the product is washed repeatedly with water while stirring, after which it is extracted with water over a period of about 12 to 36 hours. After drying under a vacuum at an elevated temperature, a purified polymer of high molecular weight is obtained.

The monomers used in preparing the polymers of this invention are well known compounds that are described in the literature. Examples of the dicarboxylic acids (III) include terphthalic acid, p-diphenylene-dicarboxylic acid, and the various p-terphenylene-dicarboxylic acids as disclosed in U.S. Pat. No. 4,131,748. Examples of difunctional diphenoxybenzenes (IV) include 1,2-bis(4-cyanophenoxy)benzene; 1,4-bis(4-cyanophenoxy)benzene; 1,2-bis(4-chlorocarbonylphenoxy)benzene; 1,2-bis(4-aminocarbonyphenoxy)benzene; 1,4-bis(4-carboxyphenoxy)benzene; 1,2-bis(4-carbomethoxyphenoxy)benzene; and the like. Examples of the amino compounds [(V) and VI] include 2,4-dihydroxy-m-phenylenediamine dihydrochloride; 2,4-dimercapto-m-phenylenediamine dihydrochloride; 2,5-dimercapto-p-phenylenediamine dihydrochloride; 2,5-dihydroxy-p-phenylenediamine dihydrochloride; and 2,4-diamino-m-phenylenediamine dihydrochloride or tetrahydrochloride.

A more complete understanding of the invention can be obtained by referring to the following illustrative examples which are not intended, however, to be unduly limitative of the invention.

EXAMPLE I

A run was carried out in which a polymer of this invention was prepared by the condensation reaction shown by the above equation. The details of the run are set forth below.

Water-white polyphosphoric acid was prepared by the addition of portions of phosphorus pentoxide (330 g) to vigorously stirred 85% phosphoric acid (217 g) which was cooled by means of an ice bath. Addition took place over a 30 minute period. The ice bath was then removed and the viscous slurry was heated with stirring to 150° C. After 6 hours, the clear, homogeneous polyphosphoric acid was ready for use in the copolycondensation reaction.

4,6-Diaminoresorcinol dihydrochloride (1.0653 g, 5.00 mmole) and terephthalic acid (0.747 g, 4.50 mmole) were added to a resin flask and covered with 150 g of polyphosphoric acid. The viscous mixture was mixed under nitrogen with a high shear stirrer. The temperature was raised to 130° C. over a 5 hour time period, care being taken to avoid excess foaming. After 16 hours, 1,2-bis(4-cyanophenoxy)benzene (0.1561 g, 0.50 mole) was added to the clear, pale yellow reaction mixture along with an additional 49 g of polyphosphoric acid. The comonomer gradually dissolved upon vigorous stirring and heating at 130° C. for 5 hours. The clear yellow solution was then heated as follows: 150° C./16 hours, 175° C./6 hours, 185° C./16 hours, and 195° C./48 hours. The clear, deep-red polymerization mixture was then climbing up the stirrer shaft. Upon cooling to 100° C., the gelatinous mixture was added to water in a Waring blender, and the fibrous precipitated yellow polymer was washed repeatedly with water. It was then extracted with water in a Soxlett extractor for 2 days. Drying overnight at room temperature/0.05 mm Hg and for 6 hours at 188° C./0.03 mm Hg yielded 1.18 g (95% yield) of polymer having an inherent viscosity of 5.44 dl/g in methanesulfonic acid at 25° C.

Analysis: Calc'd: C,72.29; H,2.70; N,11.08. Found: C,71.58; H,2.31; N,11.00.

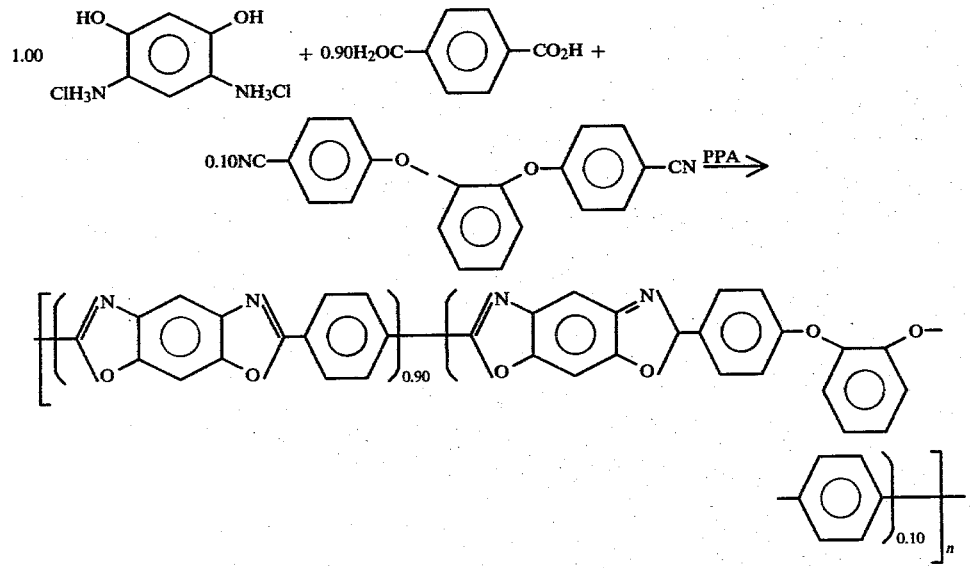

EXAMPLE II

A two-percent solution (w/v) of the Example I polymer in methanesulfonic acid was placed in a mold, and the solvent was removed under reduced pressure at 60° C. The pale yellow film that formed was rinsed with water and dried overnight at room temperature/0.10 mm Hg. The film exhibited birefringence under polarized light and had a tensile strength of 11,190 psi and a modulus of 546,000 psi.

By comparison, films prepared by this same method from the analogous poly-p-benzbisoxazole which was void of the diphenoxybenzene "swivel" structure were so brittle as to preclude physical testing to obtain modulus and tensile strength values.

EXAMPLE III

A series of runs was conducted in which articulated poly-p-benzbisoxazoles containing various proportions of diphenoxybenzene "swivel" structures were synthesized. The procedure followed in the runs was essentially the same as that described in Example I. Pertinent details of the runs are set forth hereinafter in Table I.

TABLE I

+ a($HO_2C-Ar-CO_2H$) + b($Y-Ar'-Y$)

↓

Polymer (I)

where X is oxygen and a, b, Ar, Ar' and Y are as listed below.

| Run No. | Mole Proportion ($\frac{a}{b}$) | Ar / Ar' | Y | Monomer[1] Conc. (w/w-%) | $\eta$ inh[2] dl/g |
|---|---|---|---|---|---|
| 1 | 0.75 |  | $CO_2H$ | 1.02 | 2.34 |
|   | 0.25 |  | COCl |  |  |
| 2 | 0.90 |  | $CO_2H$ | 0.91 | 3.18 |
|   | 0.10 |  | CN |  |  |
| 3 | 0.90 |  | $CO_2H$ | 2.59 | 7.08 |
|   | 0.10 |  | CN |  |  |
| 4 | 0.95 |  | $CO_2H$ | 1.20 | 5.18 |
|   | 0.05 |  | CN |  |  |
| 5 | 0.97 |  | $CO_2H$ | 0.96 | 6.75 |
|   | 0.03 |  | CN |  |  |
| 6 | 0.75 |  | $CO_2H$ | 0.90 | 4.31 |
|   | 0.25 |  | CN |  |  |
| 7 | 0.90 |  | $CO_2H$ | 0.98 | 4.37 |
|   | 0.10 |  | CN |  |  |
| 8 | 0.95 |  | $CO_2H$ | 0.61 | 3.27 |
|   | 0.05 |  | CN |  |  |
| 9 | 0.97 |  | $CO_2H$ | 0.96 | 9.88 |
|   | 0.03 |  | CN |  |  |

TABLE I-continued

[Structure: 2,4-diamino-1,5-dihydroxybenzene dihydrochloride] + a(HO$_2$C—Ar—CO$_2$H) + b(Y—Ar'—Y) → Polymer (I)

where X is oxygen and a, b, Ar, Ar' and Y are as listed below.

| Run No. | Mole Proportion ($\frac{a}{b}$) | Ar / Ar' | Y | Monomer[1] Conc. (w/w-%) | $\eta$ inh[2] dl/g |
|---|---|---|---|---|---|
| 10 | 0.90 | [p-phenylene] | CO$_2$H | 0.99 | 5.44 |
|  | 0.10 | [1,2-bis(4-phenoxy)benzene] | CN | | |
| 11 | 0.95 | [p-phenylene] | CO$_2$H | 0.93 | 6.74 |
|  | 0.05 | [1,2-bis(4-phenoxy)benzene] | CN | | |
| 12 | 0.95 | [p-phenylene] | CO$_2$H | 1.01 | 7.23 |
|  | 0.05 | [1,2-bis(4-phenoxy)benzene] | CO$_2$H | | |
| 13 | 0.97 | [p-phenylene] | CO$_2$H | 0.94 | 6.86 |
|  | 0.03 | [1,2-bis(4-phenoxy)benzene] | CN | | |
| 14 | 0.95 | [p-phenylene] | CO$_2$H | 0.96 | 7.67 |
|  | 0.05 | [bis(4-phenoxy)-p-phenylene] | CN | | |
| 15 | 0.97 | [p-phenylene] | CO$_2$H | 0.98 | 7.84 |
|  | 0.03 | [bis(4-phenoxy)-p-phenylene] | COCl | | |

[1] Weight of monomers divided by weight of polyphosphoric acid.
[2] Inherent viscosity as determined in methanesulfonic acid at 25° C.

EXAMPLE IV

Films were cast with certain of the polymers of Example III in accordance with the procedure described in Example II. A control run was also carried out in which it was attempted to cast a film from poly{[benzo(1,2-d:5,4-d')bisoxazole-2,6-diyl]-1,4-phenylene}. Mechanical properties of the films are shown below in Table II in which the Run No. designation indicates the polymer of Example III.

TABLE II

| Run No. | Modulus, psi | Tensile strength, psi |
|---|---|---|
| 3 | 226,000 | 8,100 |
| 10 | 546,000 | 11,190 |
| 11 | 336,000 | 7,100 |
| 13 | 343,000 | 9,010 |
| 14 | 455,000 | 13,500 |
| Control | (1) | (1) |

(1) Film was too brittle for mechanical properties to be obtained.

As seen from the foregoing, the present invention provides articulated para-ordered aromatic heterocyclic polymers containing diphenoxybenzene segments. The presence of these segments or "swivels" in the polymer chains permits films to be cast from methanesulfonic acid solutions. The polymers exhibit very high inherent viscosities, and the films cast from the polymers possess superior mechanical properties. The films are particularly useful for the fabrication of high strength laminates to be used in severe environment structural applications.

As will be evident to those skilled in the art, modifications of the present invention can be made in view of the foregoing disclosure without departing from the spirit and scope of the invention.

We claim:

1. A para-ordered aromatic heterocyclic polymer consisting essentially of repeating units having a structure as represented by one of the following formulas:

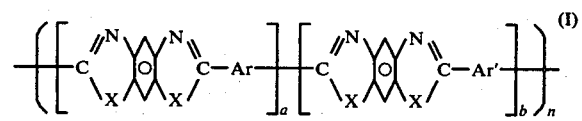

or

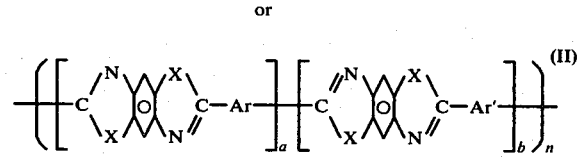

wherein X in each formula is O, S or NH; Ar is

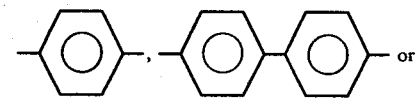

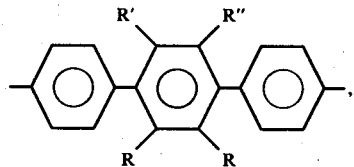

where R is a monovalent aromatic radical and R' and R" are individually selected from the group consisting of hydrogen, a monovalent aromatic radical, a monovalent aliphatic radical, a monovalent cycloaliphatic radical, and a monovalent heterocyclic radical; Ar' is

a ranges from about 0.75 to 0.97, b ranges from about 0.03 to 0.25, and the sum of a and b equals 1; and n is an integer equal to the number of repeating units.

2. The para-ordered aromatic heterocyclic polymer according to claim 1 in which R is

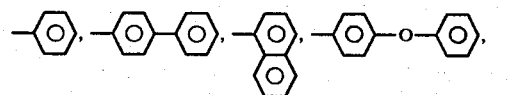

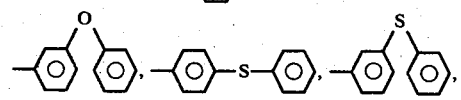

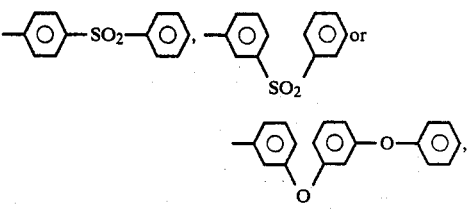

R' and R" are hydrogen, a monovalent aromatic radical as listed above, —CH$_2$CH$_3$, —CH$_2$CH$_2$CH$_3$, —CH$_2$CH$_2$CH$_2$—CH$_3$,

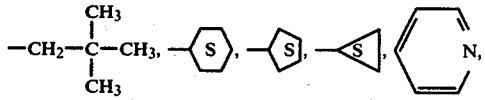

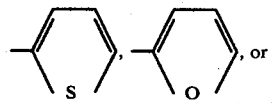

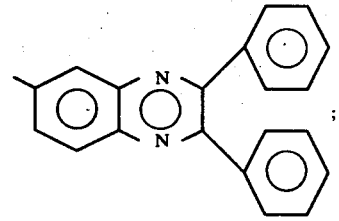

Ar' is 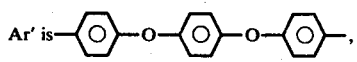

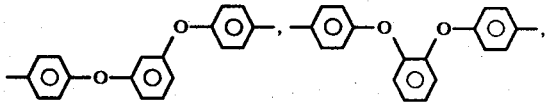

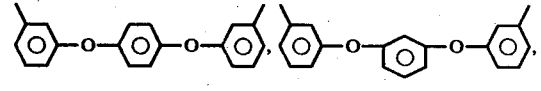

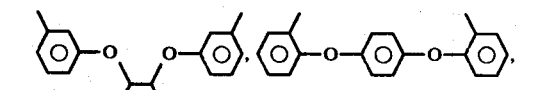

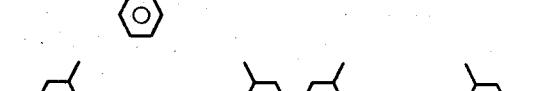

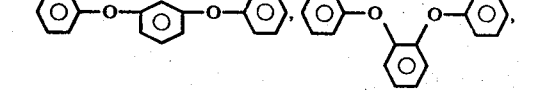

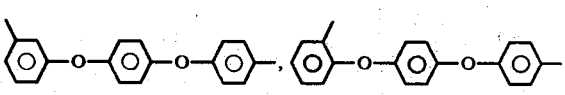

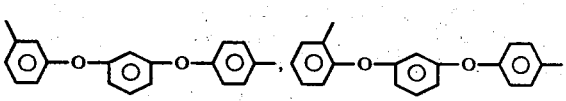

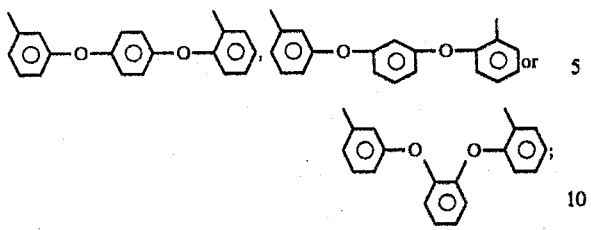 or and n has a value such that the polymer has an inherent viscosity of 2 to 12 dl/g as determined in methanesulfonic acid at 25° C.

3. The para-ordered aromatic heterocyclic polymer according to claim 2 that consists essentially of repeating units having a structure as represented by formula I.

4. The para-ordered aromatic heterocyclic polymer according to claim 2 that consists essentially of repeating units having a structure as represented by formula II.

5. The para-ordered aromatic heterocyclic polymer according to claim 3 in which X is O, Ar is

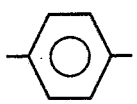

and Ar' is

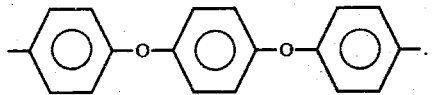

6. The para-ordered aromatic heterocyclic polymer according to claim 3 in which X is O, Ar is

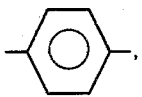, and Ar' is

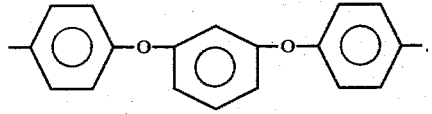.

7. The para-ordered aromatic heterocyclic polymer according to claim 3 in which X is O, Ar is

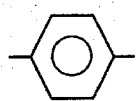

and Ar' is

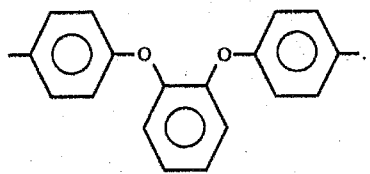

8. The para-ordered aromatic heterocyclic polymer according to claim 3 in which X is O, Ar is

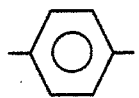

and Ar'' is

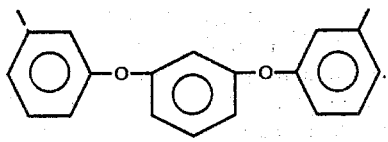

9. The para-ordered aromatic heterocyclic polymer according to claim 3 in which X is O, Ar is

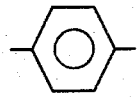

and Ar is

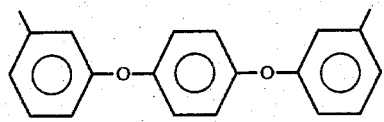.

10. As an article of manufacture, a strong, flexible film consisting essentially of a para-ordered aromatic heterocyclic polymer according to claim 1.

11. A process for preparing a para-ordered aromatic heterocyclic polymer which comprises the following steps:
(a) mixing an amino compound and a dicarboxylic acid with polyphosphoric acid, the amino compound being selected from the group of compounds having the following formulas:

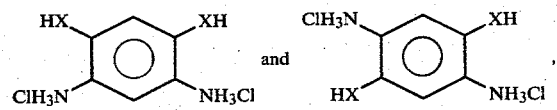, in which X is O, S or NH, and the dicarboxylic acid having the following formula:

$HO_2C—Ar—CO_2H$, in which Ar is

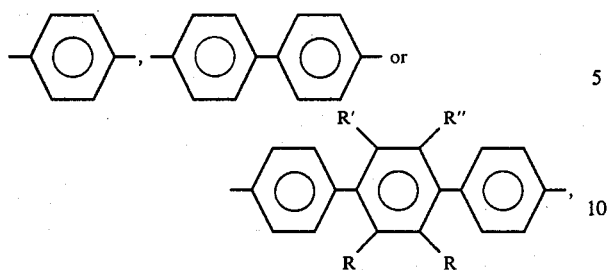

wherein R is a monovalent aromatic radical and R' and R" are individually selected from the group consisting of hydrogen, a monovalent aromatic radical, a monovalent aliphatic radical, a monovalent cycloaliphatic radical and a monovalent heterocyclic radical;

(b) heating the mixture of step (a) in an inert gas atmosphere at a temperature ranging from about 100° to 150° C. for a period of about 12 to 24 hours;

(c) at the end of the heating period of step (b), adding to the mixture a difunctional diphenoxybenzene having the following formula:

Y—Ar'—Y, in which Y is $CO_2H$, $CO_2CH_3$, COCl, CN or $CONH_2$ and Ar' is

(d) heating the mixture of step (c), in an inert gas atmosphere at a temperature ranging from about 150° to 225° C. for a period of about 36 to 96 hours; and (e) recovering a para-ordered aromatic heterocyclic polymer.

12. The process according to claim 11 in which there is used an equimolar amount of the amino compound as compared to the combined amount of the dicarboxylic acid and diphenoxybenzene.

13. The process of claim 12 in which there are used about 0.75 to 0.97 mole of dicarboxylic acid per mole of amino compound and about 0.03 to 0.25 mole of diphenoxybenzene per mole of amino compound.

* * * * *